June 19, 1923.
L. F. HELLMANN ET AL
1,459,099
AUTOMATIC BRAKE LOCK
Filed Jan. 31, 1921
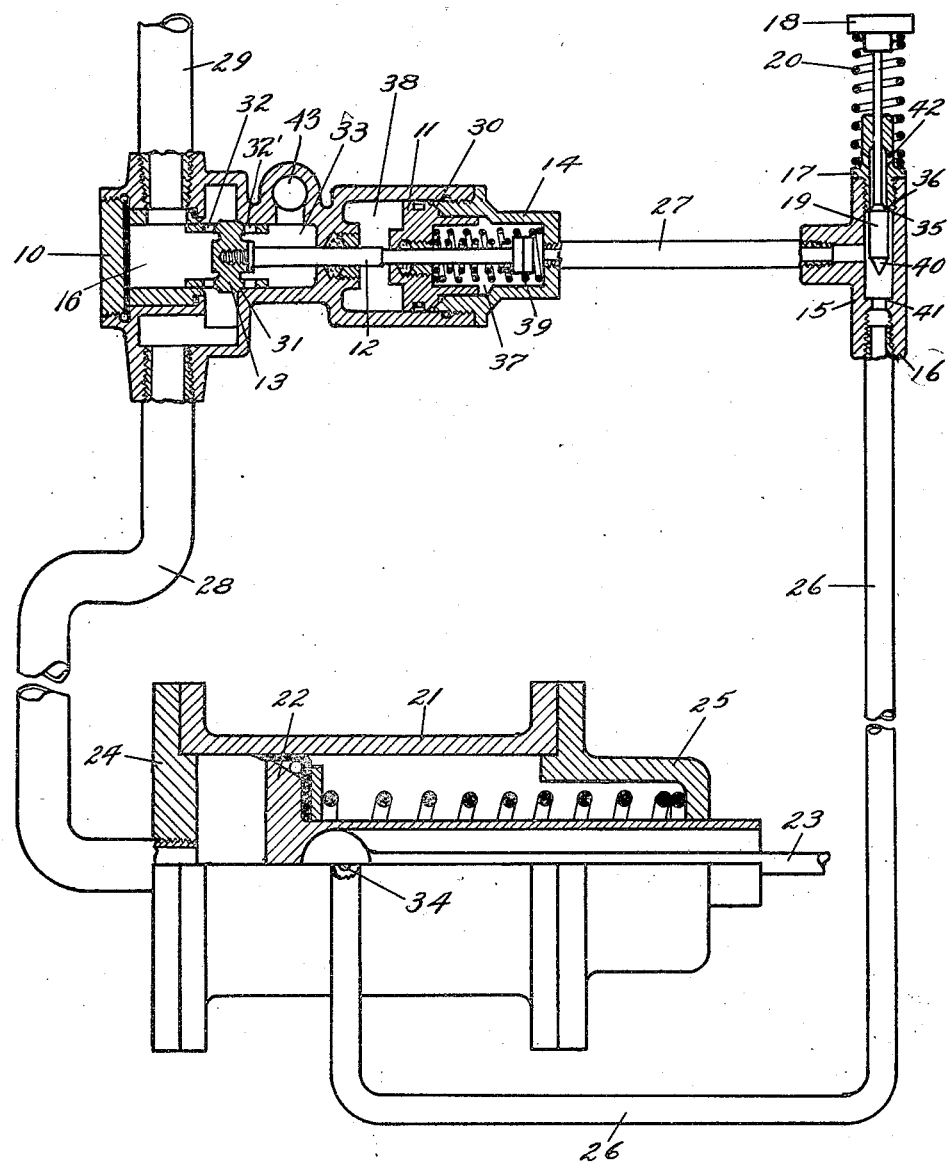
INVENTORS.
Lui F. Hellmann
William W. Baxter
By
ATTORNEY.

Patented June 19, 1923.

1,459,099

UNITED STATES PATENT OFFICE.

LUI F. HELLMANN AND WILLIAM W. BAXTER, OF INDIANAPOLIS, INDIANA.

AUTOMATIC BRAKE LOCK.

Application filed January 31, 1921. Serial No. 441,392.

*To all whom it may concern:*

Be it known that we, LUI F. HELLMANN and WILLIAM W. BAXTER, citizens of the United States, residing at Indianapolis, in the county of Marion and State of Indiana, have invented certain new and useful Improvements in Automatic Brake Locks, of which the following is a specification.

Our said invention consists in means for locking brakes of vehicles so as to prevent movement of the vehicle except after special manipulation of the controlling devices for the brakes and it is especially intended for use in connection with air brakes.

The object of our invention is to produce a means for keeping the brakes applied whenever any loss or breakage of parts or excessive wear occurs in any part of the foundation brake system.

A further object of our invention is to give the car driver a definite notification that the foundation brake system of his car has failed, or that excessive wear has occurred therein, whenever such failure or wear does occur.

A further object of our invention is to make the car driver's brake valve inoperative during the period of excessive wear or failure on the part of the foundation brake system.

A further object of our invention is to cause the car driver to take unusual steps to release the brakes on his car during periods of excessive wear or failure of the foundation brake system.

A further object of our invention is to cause the car driver to send the car to the barns for repairs whenever excessive wear or failure of any part of the foundation brake system has occurred.

Other objects will appear hereinafter.

Referring to the accompanying drawing which is made a part hereof and on which similar reference characters indicate similar parts, 10 indicates a portion of the automatic control valve, whose operation and construction are fully covered and explained in our application for Letters Patent, Serial No. 380,234, filed May 10, 1920, and with which the additional parts here shown co-operate.

In the embodiment of the invention herein set forth, as also in the co-pending application an arrangement is shown in connection with an air-brake whereby the brakes are under control of the operator so long as a sufficient pressure is maintained in the system. An auxiliary reservoir contains air under pressure for an emergency application of the brakes and this is kept out of communication with the brakes so long as sufficient pressure is kept up in the system, by means of an automatic control valve. Should the pressure in the system fall below a predetermined limit, the automatic control valve will move to cut off the passage to the usual operator's valve and will admit pressure from the auxiliary reservoir to the brakes. The brakes will then remain applied and out of control of the operator's valve, special means being provided by the use of which he can re-establish an emergency control, so as to move the car to a siding or repair shop.

The large piston head 11, the piston rod 12, the small piston head 13 and the cylinder head 14 may all be as in my prior application.

A quick release device 15 is located adjacent to the automatic control valve and is connected thereto by a pipe 27. The device 15 comprises a cap 17 attached to the body thereof, a valve 19 on a rod passing through the cap, a push button 18 at the upper end of the rod, and a spring 20 normally holding the valve at the upper limit of its travel. The valve 19 and the cap 17 have faces 35 and 36 respectively, adapted to seat against each other normally as shown in the drawing, and thus prevent escape of air through ports 42 in the cap. At the other end of its travel is a face 41 on the body, against which face 40 of the valve 19 is adapted to be seated.

A brake cylinder of ordinary type is shown at 21 this cylinder having a piston 22 with its rod 23, a rear cylinder head 24 and a front cylinder head 25. A conduit 26 leads from the brake cylinder to the quick release device. A special port may be provided in the cylinder to admit air to the conduit or the conduit may be connected to the slack adjuster holes which are standard on most brake cylinders.

From the operator's brake valve (not shown) air passes through conduit 29 to the chamber 16 of the automatic control valve, and from said valve by conduit 28 to the brake cylinder.

It will be seen by reference to our prior application referred to that whenever the car is in operative condition, the piston 11 is pushed outward and seated against the valve seat 30 and the small piston 13 is seated at 31 and acts as a valve to cut off communication from the auxiliary cylinder through conduit 43 to conduit 28. This leaves a passage at 32 through which pressure can flow freely from the operator's brake valve by way of conduits 29 and 28 to the brake cylinder, thus placing the brake cylinder under control of the car driver. As will be seen by referring to our prior application the space 33 at the rear of the small piston is in communication with the auxiliary reservoir through passage 43 and carries the same pressure as this reservoir.

When the car is in an operative condition and the foundation brake system is properly adjusted and in good working order, the piston 22 of the brake cylinder 21 does not travel far enough to uncover the port 34. During such conditions the car can be operated in the normal manner and the application and release of the brakes is under the control of the car driver through the operator's brake valve.

During normal operation the quick release valve 19 is in the position shown in the drawing, the face 35 of valve 19 being seated against face 36 of the cap 17 thereby permitting a free flow of air between conduits 26 and 27.

Pressure being admitted from the operator's valve through conduits 29 and 28 to the brake cylinder will operate the brake and in case of undue loss of motion between the parts of the foundation brake system due to excessive wear or failure of any part thereof as by loss or breakage of one of the connecting pins in the foundation brake gear, or some other part of the train of operating devices for applying the brakes the piston 22 will travel beyond its normal limit and thus open the port 34. Thereupon pressure will pass into the conduit 26 through the quick release device 15, through the conduit 27 and into the space 37 of the automatic control valve. The pressure now in the space 37 will practically balance the pressure in the space 38 of the automatic control valve. When this condition occurs the unbalanced pressure in space 33 plus the pressure of spring 39 moves the piston 13 toward the left cutting off the passage from conduit 29 through openings 32 to conduit 28 and opening a way through holes 32' at the other end of the piston from the auxiliary air reservoir to the brake cylinder by way of conduit 43, space 33 and conduit 28.

The brakes now cannot be released in the ordinary manner as the control from the operator's valve is cut off by the piston 13, and they are held applied by the pressure in the auxiliary cylinder. To release the brakes it is necessary to close the conduit from the brake cylinder through the quick release device 15 to the automatic control valve. This is done by depressing the knob 18 causing valve 19 to seat itself at the lower end of the device with its face 40 against the face 41 thereby cutting off access of air pressure and at the same time opening a passageway from chamber 7 of the automatic control valve through conduit 27 and ports 42 of the cap 17 to the outer atmosphere. This quickly releases the pressure in the space 37. As explained in our prior application the normal operation of the automatic control valve will then cause the piston 11 to be pushed outward by the pressure in space 38 and this will move piston 13 to the right closing passages 32' and opening passages 32. This re-establishes the control of the brake from the operator's brake valve and cuts off the pressure from the auxiliary cylinder. The car is now again adapted for normal operation.

It will be evident that the operation above described will recur every time the car is stopped until the defective condition of the foundation brake gear due to a worn, lost or broken part shall have been remedied. It will be evident that at each operation of the brake the car driver's attention is again called to such defective condition. The particular defect is immaterial as explained in our prior application where also a number of specific conditions are discussed, such as will occasion operation of the automatic control valve if the same is used. Reference may also be had to our co-pending application No. 420,317, filed October 28, 1920, for a disclosure of a foundation brake system in which the brakes can be applied even if parts of the system should be lost or broken, and with which devices the invention here described is adapted to co-act.

In the ordinary course of events the brakes will be set before the automatic control valve comes into operation or simultaneously therewith. But should there be a great excess of travel in the brake cylinder piston the pressure from the operator's brake valve will enter pipe 26 and operate the valve 13 so causing the pressure from chamber 33 to either augment or supersede that coming through chamber 16.

It will be obvious to those skilled in the art that the device of our invention may be modified in various ways without departing from the spirit of our invention. Therefore we do not limit ourselves to the specific embodiment of the invention shown in the drawings and described in the specification, but only as indicated in the appended claims.

Having thus fully described our said invention, what we claim as new and desire to secure by Letters Patent, is:

1. In a fluid pressure brake mechanism comprising braking means and means whereby the operator may control the same, the combination of means for applying the brakes and means to prevent release of the brakes in case of excessive wear of the brake-applying devices, substantially as set forth.

2. In a fluid pressure brake mechanism comprising braking means and means whereby the operator may control the same, the combination of means for applying the brakes and means to prevent release of the brakes in case of loss or breakage of parts of the brake applying devices, substantially as set forth.

3. In a brake mechanism having fluid operated brakes and an operator's brake valve, a cylinder, a brake-operating piston therein normally controlled by the operator's brake valve, and means for rendering the operator's brake valve inoperative whenever the travel of the piston in applying the brakes exceeds a predetermined limit, substantially as set forth.

4. In a brake mechanism having fluid operated brakes and an operator's brake valve, a cylinder, a brake-operating piston therein normally controlled by the operator's brake valve, and means for rendering the operator's brake valve inoperative with the brakes applied whenever the travel of the piston in applying the brakes exceeds a predetermined limit, substantially as set forth.

5. In a brake mechanism having fluid operated brakes and an operator's brake valve, a cylinder, a brake-operating piston therein normally controlled by the operator's brake valve, and means for warning the operator whenever the travel of the piston exceeds a predetermined limit, substantially as set forth.

6. In a brake mechanism having fluid operated brakes and an operator's brake valve, a cylinder, a brake-operating piston therein normally controlled by the operator's brake valve, means for rendering the brake valve inoperative with the brakes applied whenever the travel of the piston in applying the brakes exceeds a predetermined limit, and means for again releasing said brakes, substantially as set forth.

7. In a brake mechanism having fluid operated brakes and an operator's brake valve, a cylinder, a brake-operating piston therein normally controlled by the operator's brake valve, means for rendering the brake valve inoperative with the brakes applied whenever the travel of the piston in applying the brakes exceeds a predetermined limit, and means whereby the brake valve may again be rendered operative, substantially as set forth.

8. In a brake mechanism having fluid operated brakes, an operator's brake valve and an auxiliary reservoir, the combination of a brake cylinder, a piston therein normally controlled from the operator's valve, and means to render the operator's valve inoperative and to connect the auxiliary reservoir to the brake cylinder whenever the travel of the brake piston exceeds a predetermined limit, substantially as set forth.

9. In a brake mechanism having fluid operated brakes, an operator's brake valve and an auxiliary cylinder, the combination of a brake cylinder, a piston therein normally controlled from the operator's valve, and an automatic control valve embodying means to render the operator's valve inoperative and to connect the auxiliary reservoir to the brake cylinder whenever the travel of the brake piston exceeds a predetermined limit, substantially as set forth.

10. In a brake mechanism having fluid operated brakes and an operator's brake valve, a cylinder, a brake-operating piston therein normally controlled by the operator's brake valve, and means for automatically causing the fluid pressure to be maintained in the brake cylinder whenever the travel of the piston in applying the brakes exceeds a predetermined limit, substantially as set forth.

11. In a brake mechanism having fluid operated brakes and an operator's brake valve, a cylinder, a brake-operating piston therein normally controlled by the operator's brake valve, means for automatically causing the fluid pressure to be maintained in the brake cylinder whenever the travel of the piston in applying the brakes exceeds a predetermined limit, and means for releasing said pressure, substantially as set forth.

12. In a brake mechanism having fluid operated brakes, an operator's brake valve and an auxiliary reservoir, the combination of a brake cylinder, a piston therein normally controlled from the operator's brake valve, passages for pressure fluid leading from the operator's valve and the auxiliary reservoir respectively to the brake cylinder, means for closing the first and opening the second whenever the travel of the piston in applying the brakes exceeds a predetermined limit, and means whereby the brake valve may again be rendered operative, substantially as set forth.

13. In a brake mechanism embodying fluid operated brakes, an operator's brake valve, and an auxiliary reservoir, passages for pressure fluid leading from the operator's valve and the auxiliary reservoir respectively to the brake cylinder, and means for closing the first, opening the second and giving a warning to the operator whenever the travel of the brake piston exceeds a predetermined limit, substantially as set forth.

14. In a brake mechanism embodying an operator's valve and a fluid operated brake, a brake cylinder, a piston therein for operating the brake, a conduit leading from the operator's valve to the brake cylinder, and means for holding the brakes applied comprising devices to close said conduit, substantially as set forth.

15. In a brake mechanism embodying an operator's valve and a fluid operated brake, a brake cylinder, a piston therein for operating the brake, a conduit leading from the operator's valve to the brake cylinder, and means for holding the brakes applied comprising devices to close said conduit whenever the travel of the brake piston exceeds a predetermined limit, substantially as set forth.

16. In a brake mechanism embodying an operator's valve and a fluid operated brake, a brake cylinder, a piston therein for operating the brake, a conduit leading from the operator's valve to the brake cylinder, and means for holding the brakes applied comprising fluid operated devices to close said conduit, substantially as set forth.

17. In a brake mechanism embodying an operator's valve and a fluid operated brake, a brake cylinder, a piston therein for operating the brake, a conduit leading from the operator's valve to the brake cylinder, and means for holding the brakes applied comprising a valve, and a conduit connected to the brake-cylinder and to said valve, whereby fluid pressure is transmitted to said valve to close the conduit from the operator's valve to the brake piston whenever the travel of the brake piston exceeds a predetermined limit, substantially as set forth.

18. In a brake mechanism, embodying an operator's valve, an auxiliary reservoir and a fluid operated brake, a brake cylinder, means for transmitting fluid pressure from the operator's valve and the auxiliary reservoir respectively to the brake cylinder, an automatic control valve, means normally holding the same in position to close the second transmitting means, a conduit from the brake cylinder to the automatic-control valve whereby fluid pressure is admitted to the automatic control valve to close the first pressure transmitting means and open the second whenever the travel of the brake piston exceeds a predetermined limit, substantially as set forth.

19. In a brake mechanism, embodying an operator's valve, an auxiliary reservoir and a fluid operated brake, a brake cylinder, means for transmitting fluid pressure from the operator's valve and the auxiliary reservoir respectively to the brake cylinder, an automatic control valve, means normally holding the same in position to close the second transmitting means, a conduit from the brake cylinder to the automatic control valve whereby fluid pressure is admitted to the automatic control valve to close the first pressure transmitting means and open the second whenever the travel of the brake piston exceeds a predetermined limit thereby holding the brakes in applied position, and means to release the brakes, substantially as set forth.

20. In a brake mechanism, embodying an operator's valve, an auxiliary reservoir and a fluid operated brake, a brake cylinder, means for transmitting fluid pressure from the operator's valve and the auxiliary reservoir respectively to the brake cylinder, an automatic control valve, means normally holding the same in position to close the second transmitting means, a conduit from the brake cylinder to the automatic control valve whereby fluid pressure is admitted to the automatic control valve to close the first pressure transmitting means and open the second whenever the travel of the brake piston exceeds a predetermined limit thereby holding the brakes in applied position and a valve in said conduit adapted to release the said pressure from said automatic control valve, substantially as set forth.

21. In a brake mechanism, embodying an operator's valve, an auxiliary reservoir and a fluid operated brake, a brake cylinder, means for transmitting fluid pressure from the operator's valve and the auxiliary reservoir respectively to the brake cylinder, an automatic control valve, means normally holding the same in position to close the second transmitting means, a conduit from the brake cylinder to the automatic control valve whereby fluid pressure is admitted to the automatic control valve to close the first pressure transmitting means and open the second whenever the travel of the brake piston exceeds a predetermined limit thereby holding the brakes in applied position, and means to release the brakes comprising a valve adapted to close said conduit and open a passage from the automatic control valve to the atmosphere to relieve said pressure, substantially as set forth.

22. In a brake mechanism, embodying an operator's valve, an auxiliary reservoir and a fluid operated brake, a brake cylinder, means for transmitting fluid pressure from the operator's valve and the auxiliary reservoir respectively to the brake cylinder, an automatic control valve, means normally holding the same in position to close the second transmitting means, a conduit from the brake cylinder to the automatic control valve whereby fluid pressure is admitted to the automatic control valve to close the first pressure transmitting means and open the second whenever the travel of the brake piston exceeds a predetermined limit, thereby holding the brakes in applied position, said conduit having a branch passage connecting with the atmosphere, a valve normally closing said passage and adapted to be actuated to open the same and shut off said conduit from the brake cylinder, whereupon the automatic control valve may return to normal position, substantially as set forth.

23. In a brake mechanism embodying fluid pressure operated brakes, an operator's brake valve and an auxiliary reservoir, the combination of a brake piston, a cylinder therefor, an automatic control valve for said auxiliary reservoir, and a passage leading from said brake cylinder to the rear side of said control valve, whereby pressure from said auxiliary reservoir may be transmitted to the rear of the control valve, substantially as set forth.

24. In a brake mechanism embodying a foundation brake mechanism, the combination of a cylinder, a fluid-operated piston therein for applying the brakes, and means for causing it to hold the brakes in applied position on any failure of the foundation brake mechanism, substantially as set forth.

25. In a brake mechanism embodying a foundation brake mechanism, the combination of means for normally applying the brakes including a piston therein, an automatic valve controlling a source of fluid pressure for actuating said piston and being adapted to release the pressure and hold the brakes applied whenever the travel of the piston exceeds a predetermined amount, substantially as set forth.

26. In a braking device embodying a foundation brake mechanism, the combination of fluid pressure operated means for applying the brakes and, means to prevent release of the brakes on any failure of the foundation brake mechanism, substantially as set forth.

27. In a fluid pressure brake mechanism comprising braking means and means whereby the operator may control the same, the combination of means for applying the brakes and means to prevent release of the brakes in case of excessive travel of the brake applying devices, substantially as set forth.

28. In a fluid pressure brake system, a brake, a cylinder, a piston therein, and means connected to the cylinder and adapted to give a warning to the operator as soon as an overtravel of the piston develops, substantially as set forth.

29. In a fluid pressure brake system, a cylinder, a piston therein, and means whereby a signal is given to the operator as soon as an over-travel of the piston develops, substantially as set forth.

30. In a fluid pressure brake system, a cylinder, a piston therein, means under control of the operator to move the piston and apply the brakes, and means operated on overtravel of the brake to lock out the operator's brake valve, substantially as set forth.

In witness whereof, we have hereunto set our hands and seals at Indianapolis, Indiana, this 21st day of January, A. D. nineteen hundred and twenty-one.

LUI F. HELLMANN. [L. S.]
WILLIAM W. BAXTER. [L. S.]

Witnesses:
M. L. SHULER,
CAREY S. FRYE.